United States Patent
Chakraborty et al.

(10) Patent No.: US 12,223,432 B2
(45) Date of Patent: Feb. 11, 2025

(54) USING DISENTANGLED LEARNING TO TRAIN AN INTERPRETABLE DEEP LEARNING MODEL

(71) Applicant: INTERNATIONAL BUSINESS MACHINES CORPORATION, Armonk, NY (US)

(72) Inventors: Supriyo Chakraborty, White Plains, NY (US); Seraphin Bernard Calo, Cortlandt Manor, NY (US); Jiawei Wen, State College, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 823 days.

(21) Appl. No.: 17/133,437

(22) Filed: Dec. 23, 2020

(65) Prior Publication Data

US 2022/0198266 A1    Jun. 23, 2022

(51) Int. Cl.
*G06N 3/088*  (2023.01)
*G06F 18/2137*  (2023.01)
*G06N 3/047*  (2023.01)
*G06V 30/262*  (2022.01)

(52) U.S. Cl.
CPC ......... *G06N 3/088* (2013.01); *G06F 18/2137* (2023.01); *G06N 3/047* (2023.01); *G06V 30/274* (2022.01)

(58) Field of Classification Search
CPC .. G06F 18/2137; G06V 30/274; G06N 20/20; G06N 3/045; G06N 3/047; G06N 3/08; G06N 3/088; G06N 5/01
See application file for complete search history.

(56) References Cited

U.S. PATENT DOCUMENTS

| | | |
|---|---|---|
| 10,158,859 B2 | 12/2018 | Nowozin et al. |
| 10,445,622 B2 | 10/2019 | Kicanaoglu et al. |
| 10,469,217 B2 | 11/2019 | Opshaug et al. |
| 10,635,703 B2 | 4/2020 | Dunne et al. |

(Continued)

FOREIGN PATENT DOCUMENTS

WO    WO-2019200207 A1  *  10/2019  ............. G01V 1/181

OTHER PUBLICATIONS

International Search Report and Written Opinion issued Feb. 8, 2022 in related application PCT/EP2021/078605; 12 pgs.

(Continued)

*Primary Examiner* — Brent Johnston Hoover
(74) *Attorney, Agent, or Firm* — Intelletek Law Group, PLLC; Gabriel Daniel, Esq.

(57) ABSTRACT

A method and system of training an interpretable deep learning model includes receiving an input set of data, which may be complex. The input set of data is provided to deep learning model for feature extraction. In an exemplary embodiment, the deep learning model generates a disentangled latent space of features from the feature extraction. The features may comprise semantically meaningful data which is then provided to a low-complexity learning model. The low-complexity learning model generates output based on a specified task (for example, classification or regression). Being a low-complexity learning model provides confidence that the data output from the deep learning model is inherently interpretable.

20 Claims, 9 Drawing Sheets

(56) References Cited

U.S. PATENT DOCUMENTS

| | | | |
|---|---|---|---|
| 10,643,131 B1 | 5/2020 | Matthey-de-L'Endroit et al. | |
| 10,692,265 B2 | 6/2020 | Hadap et al. | |
| 2018/0165554 A1* | 6/2018 | Zhang | G06N 3/045 |
| 2019/0354807 A1 | 11/2019 | Tsai et al. | |
| 2020/0041276 A1 | 2/2020 | Chakravarty et al. | |
| 2020/0097771 A1 | 3/2020 | Min et al. | |
| 2020/0184660 A1 | 6/2020 | Shi et al. | |
| 2020/0234110 A1 | 7/2020 | Singh et al. | |
| 2020/0234468 A1 | 7/2020 | Lerchner et al. | |
| 2020/0273541 A1* | 8/2020 | Costello | G16B 40/20 |
| 2023/0154627 A1* | 5/2023 | Irving | G06N 3/0455 706/20 |

OTHER PUBLICATIONS

Mell, P. et al., "Recommendations of the National Institute of Standards and Technology"; NIST Special Publication 800-145 (2011); 7 pgs.

Rudin, C. et al., "Stop Explaining Black Box Machine Learning Models for High Stakes Decisions and Use Interpretable Models Instead"; arXiv:1811.10154v3 [stat.ML] (2019); 20 pgs.

Yi, Z. et al.,; "BSD-GAN: Branched Generative Adversarial Network for Scale-Disentangled Representation Learning and ImageSynthesis", Cornell University Library, arXiv:1803.08467v5, 12 pgs., Aug. 4, 2020.

Hsu, W., et al., "Unsupervised Learning of Disentangled and Interpretable Representation From Sequential Data", 31st Conference on Neural Information Processing Systems (NIPS-2017); 12 pgs.

Kumar, A. et al., "Variational Inference of Disentangled Latent Concepts From Unlabeled Observations", Cornell University Library, arXiv:1711.00848v3, (2018); 16 pgs.

Gyawali, P. K. et al., "Improving Disentangled Representation Learning with the Beta Bernoulli Process"; arXiv:1909.01839v1 [cs.LG] (2019); 11 pgs.

Gyawali, P. K. et al., "Semi-Supervised Learning by Disentangling and Self-Ensembling over Stochastic Latent Space", Cornell University Library, arXiv:1907.09607v1 (2019); 10 pgs.

Kimmel, J.C., "Disentangling a Latent Space"; http://jkimmel.net (2019); 4 pgs.

* cited by examiner

Lambda = 0
- batch accuracy = 0.06
- Reconstruction loss = 149.4

Lambda = 50
- batch accuracy = 0.991
- Reconstruction loss = 126.15

Lambda = 100
- batch accuracy = 0.995
- Reconstruction loss = 125.27

USING DISENTANGLED LEARNING TO TRAIN AN INTERPRETABLE DEEP LEARNING MODEL

STATEMENT REGARDING FEDERALLY SPONSORED RESEARCH OR DEVELOPMENT

This application has been written with Government support under Contract No.: W911NF-16-3-0001 awarded by the US Army. The Government has certain rights in this invention.

BACKGROUND

Technical Field

The present disclosure generally relates to data processing, and more particularly, to systems and methods of using disentangled learning to train an interpretable deep learning model.

Description of the Related Art

Neural networks are generally considered technology that mimics the operation of a living brain. Artificial networks simulate layers of decision making to perform specified tasks. Tasks include for example, identification and classification of features. The layers may include an input layer, an output layer and at least one hidden layer in between. Each layer performs specific types of sorting and ordering in a process that some refer to as "feature hierarchy."

To better understand the features of the present disclosure, it may be helpful to discuss what is known about deep neural networks. Deep neural networks may be used in processing unlabeled or unstructured data. Deep learning represents a form of machine learning where technologies using aspects of artificial intelligence seek to classify and order information in ways that go beyond simple input/output protocols. Deep neural networks extract data representations that are often difficult or overly time consuming for a human to interpret. Meaningful expressions of data from complex data sets may be provided with minimal user intervention.

Much of how deep neural networks operate remains unknown and unexplained. Generally, deep neural networks may not be given rules or conditions to follow when performing a task. Deep learning is useful for the performance it provides in processing large batches of data with minimal user intervention.

There is currently an industry effort to better understand and explain (interpret) how a deep neural network behaves so that modeling can be improved. Interpretability (or explainability) is with respect to the task being performed. This means, for example, for an input image, which is classified as a "Dog", the explanation from a model indicates why or which features of the input image was most responsible for the classification. So, we are trying to explain the classification (or regression) model.

Traditionally, a model is trained for a specific task. This model extracts features required from the input and predicts the output. If the model architecture is simple, then it cannot learn complicated decision boundaries and its performance suffers on difficult datasets. Alternately, if a complex deep architecture is used, then the model can learn difficult decision boundaries and perform really well. However, simple models are interpretable and complex deep models are not. The choice in one type of model over another requires an undesirable tradeoff. Simple models are interpretable but poor in performance, whereas deep models are uninterpretable but provide great performance.

Some current approaches use, for example, an explanator module to provide the interpretability of a complex deep model. An explanator module is typically separate from the deep learning model. The explanator module, for example, looks at a data model and an image and generates an explanation externally from the learning model. An explanation may highlight the input features whose presence (and absence) were the most responsible for the model's decision. However, the explanation is considered a guess by the explanator and is not necessarily a true explanation of how the learning model arrived at its output.

Other approaches may include using a surrogate model that provides localized explanations around a data point. However, the output from a surrogate model may also be based on inferences and is not necessarily an accurate depiction of the deep learning model's decisions. Surrogate models use features that are different from the original neural network, and only explain the specific example. In addition, a surrogate model on its own may not help explain the global model. A surrogate model is normally restricted to explaining a small region of the decision boundary in the neighborhood of a given test data point.

As can be seen, there remains a challenge in finding a way to better explain how a deep learning model operates to refine and improve its training.

SUMMARY

According to an embodiment of the present disclosure, a method of training an interpretable deep learning model for a machine learning system is provided. The method includes receiving an input set of data. The input set of data is provided to a deep neural network model. Features are extracted from the deep neural network model. A latent space of vectors is generated comprising the extracted features. The latent space of vectors is fed to a task-specific model. In addition, interpretable predictions of feature dimensions are generated from the task-specific model.

In one embodiment of the method, the features are extracted using an encoder module.

According to another embodiment of the present disclosure, a computer program product for training an interpretable deep learning model for a machine learning system is provided. The computer program product includes one or more computer readable storage media, and program instructions collectively stored on the one or more computer readable storage media. The program instructions include receiving an input set of data. The input set of data is provided to a deep neural network model. Features are extracted from the deep neural network model. A latent space of vectors is generated comprising the extracted features. The latent space of vectors is fed to a task-specific model. In addition, interpretable predictions of feature dimensions are generated from the task-specific model.

According to one embodiment, the latent space of vectors are disentangled representations of the input set of data.

According to another embodiment of the present disclosure, a computer server is disclosed. The computer server includes: a network connection; one or more computer readable storage media; a processor coupled to the network connection and coupled to the one or more computer readable storage media; and a computer program product including: program instructions collectively stored on the one or more computer readable storage media, the program instructions include receiving an input set of data. The input set of data is provided to a deep neural network model. Features are extracted from the deep neural network model. A latent space of vectors is generated comprising the extracted features. The latent space of vectors is fed to a task-specific model. In addition, interpretable predictions of feature dimensions are generated from the task-specific model.

According to one embodiment, the task-specific model is a low-complexity learning model.

According to another embodiment of the present disclosure, a method of training an interpretable deep learning model for a machine learning system is provided. The method includes receiving an input set of data. The input set of data is provided to a Beta variational autoencoder. The Beta variational autoencoder generates an output representation of the input set of data. The output representation is processed using a low-complexity learning model. The low-complexity learning model determines a task specific output set of data. In addition, an interpretation of the input set of data is presented based on the task specific output set of data.

In one embodiment, the output representation of the input set of data generated by the Beta variational autoencoder, is a latent space of dimensional vectors, organized by features with a semantic relationship.

According to another embodiment of the present disclosure, a computer program product for training an interpretable deep learning model for an artificial intelligence computing system is provided. The computer program product comprises one or more computer readable storage media, and program instructions collectively stored on the one or more computer readable storage media. The program instructions include receiving an input set of data. The input set of data is provided to a Beta variational autoencoder. The Beta variational autoencoder generates an output representation of the input set of data. The output representation is processed using a low-complexity learning model. The low-complexity learning model determines a task specific output set of data. In addition, an interpretation of the input set of data is presented based on the task specific output set of data.

In one embodiment, the program instructions further include reconstructing the input set of data using a decoder module. A reconstruction error loss is determined from reconstructing the input set of data. A classification loss or a regression loss is determined from the task specific output set of data. In addition, the Beta variational autoencoder, the decoder module, and the low-complexity learning model are trained using a combination of the reconstruction error loss and the classification loss or the regression loss.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of training an interpretable deep learning model of data. As will be appreciated, aspects of the subject disclosure improve on the interpretability of data from a deep learning model. Generally, the embodiments may be practiced in the field of machine learning applications.

Definitions

Deep Neural Network or Deep Learning Model: A neural network comprising more than two layers.

Low-Complexity Model: A low-complexity model may be parametric models (for example, linear models), non-parametric models (for example, K-Nearest neighbor), simple decision trees (for example, classification and regression tree (CART)), or ensemble models (for example, Bagging method, Random Forest, or Boosting method, Gradient Boosting Trees).

Unsupervised Learning: A machine learning process that looks for previously undetected patterns in a data set with no pre-existing labels and with a minimum of human supervision.

Supervised Learning: A machine learning task of learning a function that maps an input to an output based on example input-output pairs.

Overview

In the subject disclosure that follows, embodiments propose a deep learning model system with a structure that may be inherently more interpretable than traditional deep learning models. Aspects of the subject disclosure reconcile the tradeoff between the performance of a deep learning model and the interpretability of a low-complexity model by decoupling the burden of feature extraction away from a task-specific model. It should be appreciated that the subject disclosure uses the unconventional feature of combining a relatively low complexity model with the output from a deep learning model to provide inherent interpretability of the deep learning output. In an exemplary embodiment, a feature extractor model (for example, an encoder) can be very complex, but the task-specific model may be a low-complexity type (for example, a linear model). The encoder may handle all the complexity involved with extracting the right disentangled latent space. Once the disentangled latent space is obtained, embodiments use as a task-specific model, which processes the latent space features that are extracted by the encoder. As will be appreciated, the output from the task-specific model may reliably be considered explainable in terms of the features extracted by the encoder.

As will be appreciated, aspects of the subject disclosure provide the unexpected ability to accurately classify the encoder extracted features even when they are non-interpretable. By including disentangled learning in the embodiments, the system (or process) may generate interpretable features from the encoder which are also high performing. If these features that are extracted by the encoder can be associated with semantically meaningful concepts, then the low complexity model which is already assumed to be interpretable may remain interpretable and also perform well. Additional discussion on generating semantically meaningful data is described below with respect to FIGS. 2 and 6. As will be further appreciated, this is an improvement over using an external mechanism such as explanator, because the model of the subject technology becomes inherently explainable through the combination of the deep learning model and the low-complexity task specific model. There is no need of an external explanator to explain the overall model.

Conventionally, the output of an unsupervised learning system is evaluated using an external system (for example, an explanator module) to allow for the expressiveness of the unsupervised learning system to remain robust. When processing highly complex data it may be especially desirable to use unsupervised learning models, which provide high levels of disentanglement of extracted features. Inherently, humans may be unable to discern the grouping of data from a system that provides high disentangled output, thereby necessitating an appropriately configured computing device as described herein. While high levels of expressiveness may be desirable, if the output lacks a discernable accuracy it may be impossible for a human user to understand the criteria used by the unsupervised model when observing a batch of dimensions. In addition, the ability of external explanators to provide an accurate explanation of the results from more complex data becomes less reliable since explanators all rely on estimated inferences. As will be appreciated, the combination of a deep learning model to handle the more intensive disentangled learning and a low-complexity model to handle a specific task strikes a balance by allowing the deep learning portion to remain highly expressive with its results while the low-complexity model provides a higher degree of explainability of the output from the deep learning section of the system. Moreover, the results provide an improvement to the accuracy of data being processed which can lead to significant advancements in the technologies of image processing, feature identification, and drug discovery to name but a few.

Example Architecture

Figure 1:
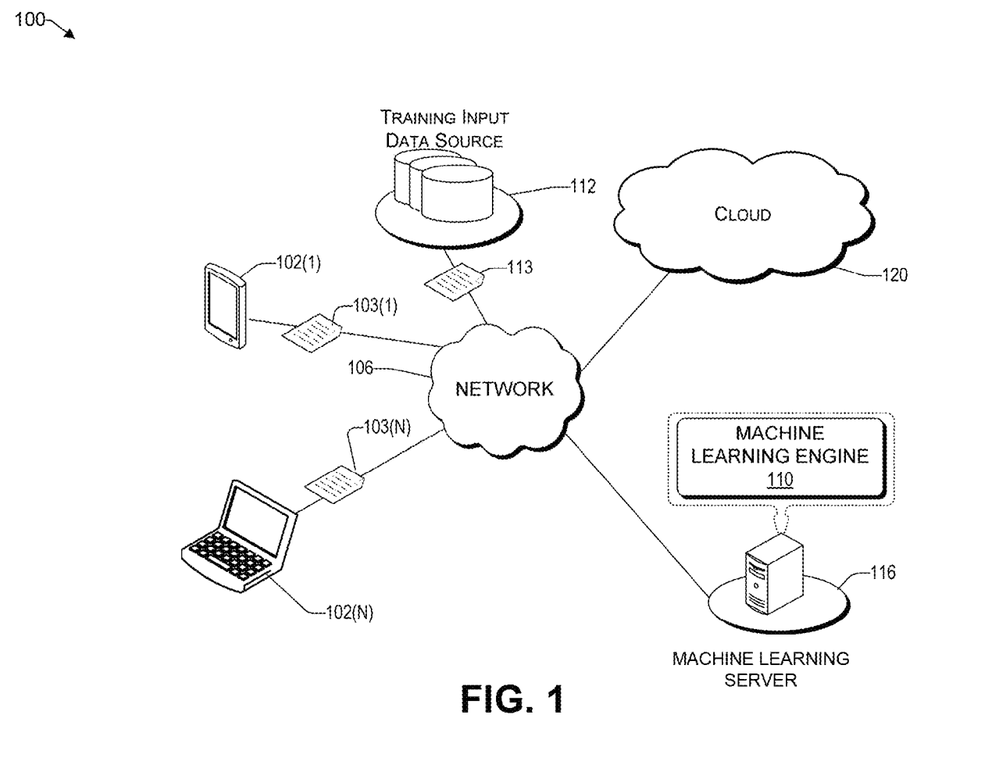
FIG. 1 is a block diagram of an architecture for interpretable deep learning of data according to an embodiment.

FIG. 1 illustrates an example architecture 100 for interpretable deep learning of data. Architecture 100 includes a network 106 that allows various computing devices 102(1) to 102(N) to communicate with each other, as well as other elements that are connected to the network 106, such as a training data input source 112, a machine learning server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the machine learning engine 110, which is a software program running on the machine learning server 116, to communicate with a training data input source 112, computing devices 102(1) to 102(N), and the cloud 120, to provide data processing. The training data input source 112 may provide data that will be processed under one or more techniques described here. The data processing may be one or more user specified tasks including for example, feature learning and classification. The data input into the training data input source 112 may be for example, complex images, textual data, numbers, symbols, genetic sequences, or other data that may be unexplainable by direct human analysis. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the machine learning engine 110 of the machine learning server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the machine learning engine 110 to identify features present in the input data stored in the computing device 102(N).

While the training data input source 112 and the machine learning engine 110 are illustrated by way of example to be on different platforms, it will be understood that in various embodiments, the training data input source 112 and the machine learning server 116 may be combined. In other embodiments, these computing platforms may be implemented by virtual computing devices in the form of virtual machines or software containers that are hosted in a cloud 120, thereby providing an elastic architecture for processing and storage.

Figure 2:
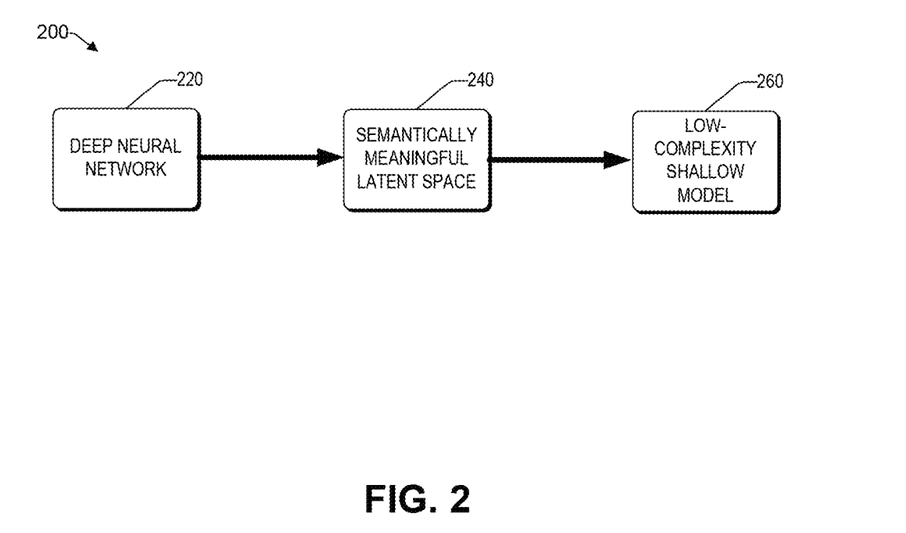
FIG. 2 is a block diagram of an architecture for training an interpretable deep learning model according to an embodiment.

Reference now is made to FIG. 2, which is an architecture 200 for training an interpretable deep learning model according to an embodiment. The embodiments provide a balance between performance output of a deep learning model and the interpretability of the model. The architecture 200 may generally include a deep neural network 220. The deep neural network 220 may process complex input data to extract features which when presented for evaluation may not be inherently interpretable to a human user of the system. The deep neural network 220 processes the features extracted from the input to generate a semantically meaningful latent space of features 240. As used herein, the term "semantically meaningful" includes the meaning that the features may be grouped according to some shared or similar characteristic or sequence identified by the deep neural network 220. As will be appreciated, the deep neural network 220 provides the bulk of effort in processing the input data. The data in the latent space 240 may be fed to a low-complexity shallow model 260, which in one example may, be a linear classifier.

The low-complexity model 260 may use a supervised learning process. The low-complexity model may be configured to identify the dimension(s) being expressed by the content in the latent space 240. Generally, the low-complexity model may process localized boundaries of data in the latent space 240 to determine the criteria being processed. As a result, the output from the low-complexity shallow model 260 becomes more explainable than the data in the latent space 240.

Figure 3:
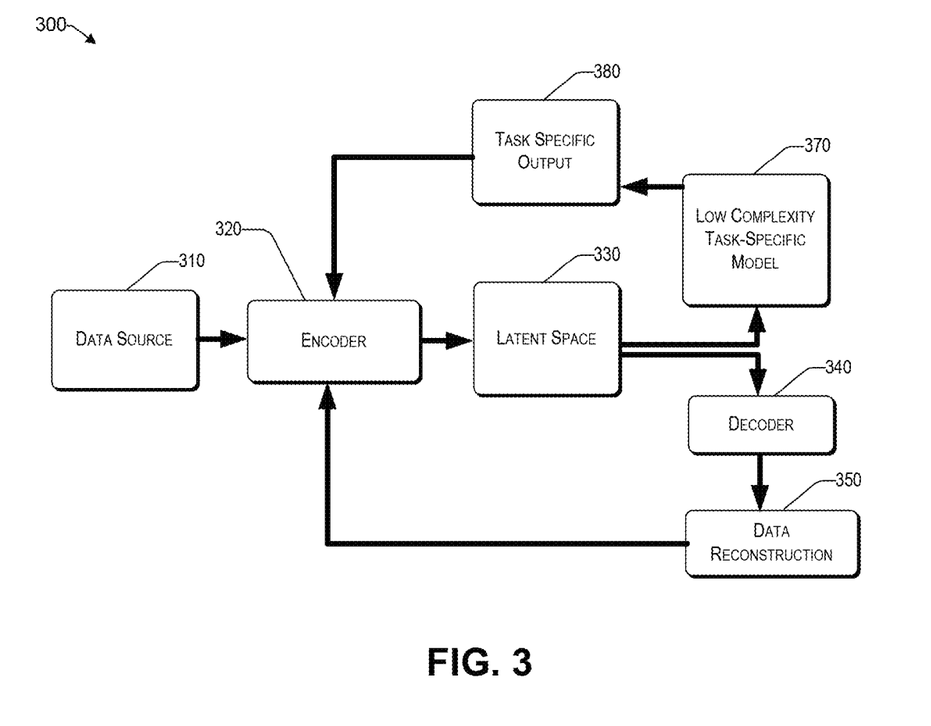
FIG. 3 is a block diagram of a system training an interpretable deep learning model according to an embodiment.

Referring now to FIG. 3, a system 300 for training an interpretable deep learning model is shown according to an embodiment. In an exemplary embodiment, a deep learning section is supplemented with a low-complexity model 370 to provide more inherent interpretability of the data from the deep learning section. The overall interpretable model of the system 300 may operate under the parameters of the following equation:

$$L(\theta, \phi, w; x) = E_{(Q_\phi(z|x))}[\log P_\theta(x|z)] - \beta D_{KL}(Q_\phi(z|x)|p(z)) + \lambda \text{Loss}(y, Fw(y|z)). \quad \text{Eq. 1:}$$

In the system 300, a deep neural network may comprise a variational autoencoder (VAE). In an exemplary embodiment, the autoencoder may be a Beta variational autoencoder (β-VAE). In this context, the input from a data set 310 may be mapped to a distribution. As an illustrative example only and not by way of limitation, the data set 310 may represent an image that is being processed for features.

The (β-VAE) may be unsupervised and used to learn a latent space 330. Using an encoder module 320, the latent space 330 is generated based on the input data set 310. The encoder module 320 may translate the original high-dimension input from the data set 310 into the latent low-dimensional data features comprising the latent space. In the β-VAE, a given input sample is first encoded (by the encoder module 320) as a distribution over the latent space 330. In Eq. 1, an encoder loss from the encoder module 320 is given by $D_{KL}(Q_\phi(z|x)|p(z))$. The distribution may be modeled as a Gaussian mixture. A sample may be drawn from the distribution and decoded by the decoder module 340. The decoder loss from decoder module 340 is given by $E((Q\phi(z|x)) [\log P\theta (x|z)]$. The difference between the original sample and the reconstructed sample may be used to compute the reconstruction loss. The β value may be used to ensure that factors in the latent space 330 are properly disentangled. Ideally, the reconstructed data 350 version from the decoder module 340 matches the input data set. The loss may be used to optimize the input to the encoder module 320. In the subject disclosure, in addition to the traditional ELBO loss that is used to train a β-VAE as an unsupervised model, a classification/regression loss term may be used. In the model training is made supervised.

The classification or regression loss (given by λ Loss(y, Fw (y|z))) ensures that the disentangled factors will also lead to better performance on the task.

The combination of the loss terms is used to optimize the encoder module 320 to generate a better disentangled latent space.

It may be noteworthy that the β-VAE separates out the latent space 330 into a disentangled space of factors. For example, given that a gaussian mixture comprises different files, given any input data, the system may decompose the files into disentangled factors. Disentangled factors may be correlated so that if the system changes one factor, the other factors are not affected by the change. Thus, in some embodiments, the structure proposed allows one to isolate a factor. Since each factor represents a semantic property of the input data (for example, eyes, hair, etc.), each dimension in the disentangled space represents a disentangled feature. For illustrative purposes only, one may consider the input to the encoder module 320 to be a dataset of human faces. One can imagine the disentangled factors to represent semantic features such as skin tone, hair color, facial orientation and so on. In the subject example, a user may not overtly know which dimension in the latent space represents skin tone and which represents hair color or another feature. To identify the semantic properties represented by the latent factors a user may need some assistance or intimation for traversing the latent space. As will be appreciated, additional aspects of the system 300 allows a human expert to inspect the latent space and perform latent space traversal to associate semantic labels to latent factors (or dimensions).

In an exemplary embodiment, the system 300 includes a low-complexity model 370 coupled to the output of the encoder module 320. The low complexity model 370 may be a task specific model whose output 380 may be used to perform a user specified task (for example, dimensionality reduction, classification, prediction, anomaly detection, etc.).

In some embodiments, noise from the reconstruction and task specific output may be used to train the models (encoder, decoder, low-complexity). The latent space 330 input may be trained using the losses. The supervised loss (classification/regression) in the system 300 may be represented by the portion of Eq. 1 that includes λ Loss(y, Fw (y|z)). The factors/features from A Loss(y, Fw (y|z)) may be used to train the overall model to improve its accuracy. In some embodiments, the amount of loss in the model may be user adjustable.

Example Data Applications

Figure 4:
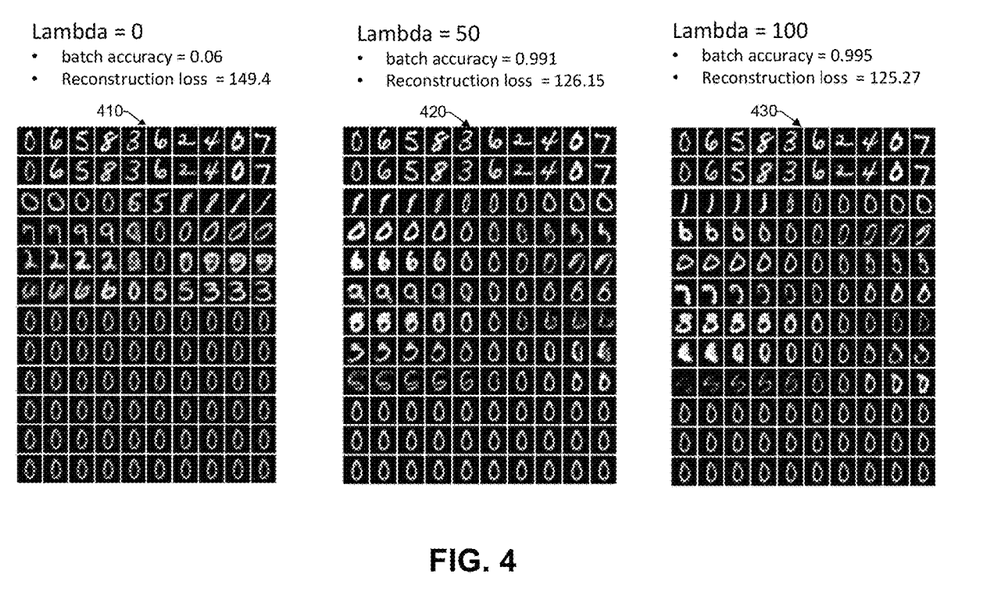
FIG. 4 is a diagrammatic view of batches of latent dimensions under various levels of supervision according to some embodiments.

Referring to FIG. 4, three sets of batch data (sets 410, 420, and 430) are shown with different lambda values of a loss factor applied to the data sets. The first two rows represent data being reconstructed. Each row below the first two rows is a latent dimension traversal that has undergone 200 epochs of training.

Set 410 is processed without any additional loss factor added to the process and represents an unsupervised disentanglement of data. Four rows yielded some reconstruction with some identifiable semantic dimensionality. However, the batch accuracy has only a 6% accuracy score. The reconstruction loss was 149.4.

Set 420 represents data that was processed using a supervised disentanglement. A lambda value of 50 was used. In set 520, seven rows yielded some reconstruction with some identifiable semantic dimensionality. The batch accuracy increased to 99.1% with supervision and the reconstruction loss dropped to 126.15.

Set 430 represents data that was processed using increased supervised disentanglement. The lambda value applied to the data training was 100 which increased the accuracy to 99.5% and the reconstruction loss decreased even further to 125.27.

Figure 5:
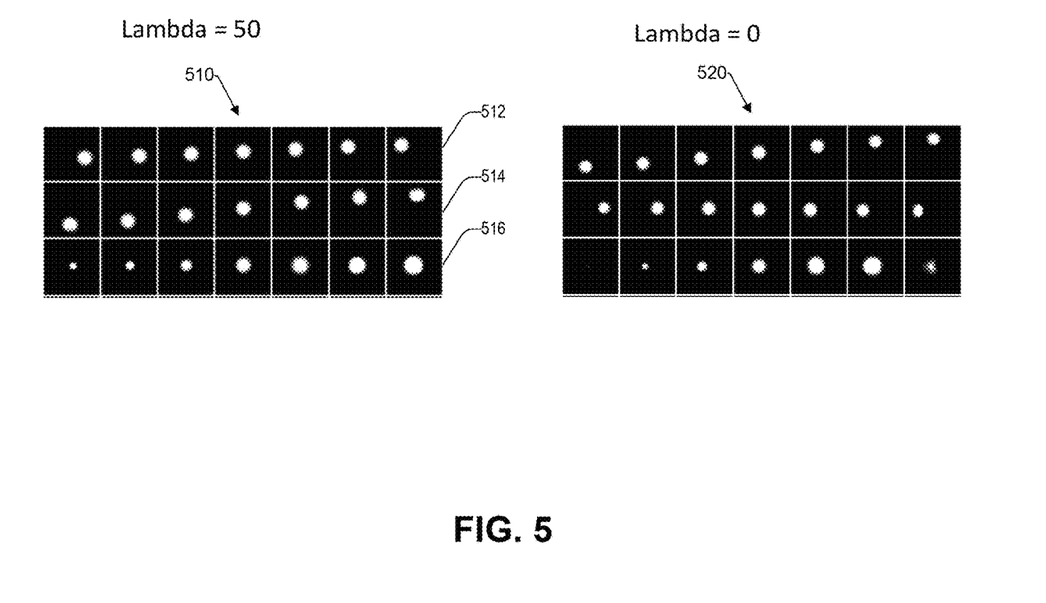
FIG. 5 is a diagrammatic view of results of example data sets under various levels of supervision according to embodiments of the subject disclosure.

Referring now to FIG. 5, a comparison of between a guided β-VAE learning model system and an unguided system on an example dataset is shown. The input dataset comprises two dimensional shapes procedurally generated from six ground truth independent latent factors. The factors of the example dataset are color, shape, scale, rotation, "X" and "Y" positions of a sprite. All possible combinations of these latent factors are present exactly once, generating N=737280 total images. The output set 510 was processed by a guided β-VAE of the subject technology using a lambda value of 50. The output set 520 was processed using an unguided β-VAE. The first two rows of each set represent data being reconstructed.

Referring to the third, fourth, and fifth rows from the top of the sets, one can see results that are more inherently interpretable by a person in set 510 than for the same rows in set 520. For example, in row 512 of set 510, the naked eye can discern that the underlying semantic criteria for the latent dimension being processed was based on the "X" position of the sprite (which may represent a lateral or horizontal position in a Cartesian coordinate system). In the analogous row of set 520, it is the same latent dimension but the interpretation is less clear. Similarly, in row 514 of set 510, it can be seen that the latent dimension represents the "Y" position (which may represent a vertical position in a Cartesian coordinate system). In row 516 of set 510, the guided β-VAE discernibly shows that the latent dimension represents a scale dimension.

Example Methodology

Figure 6:
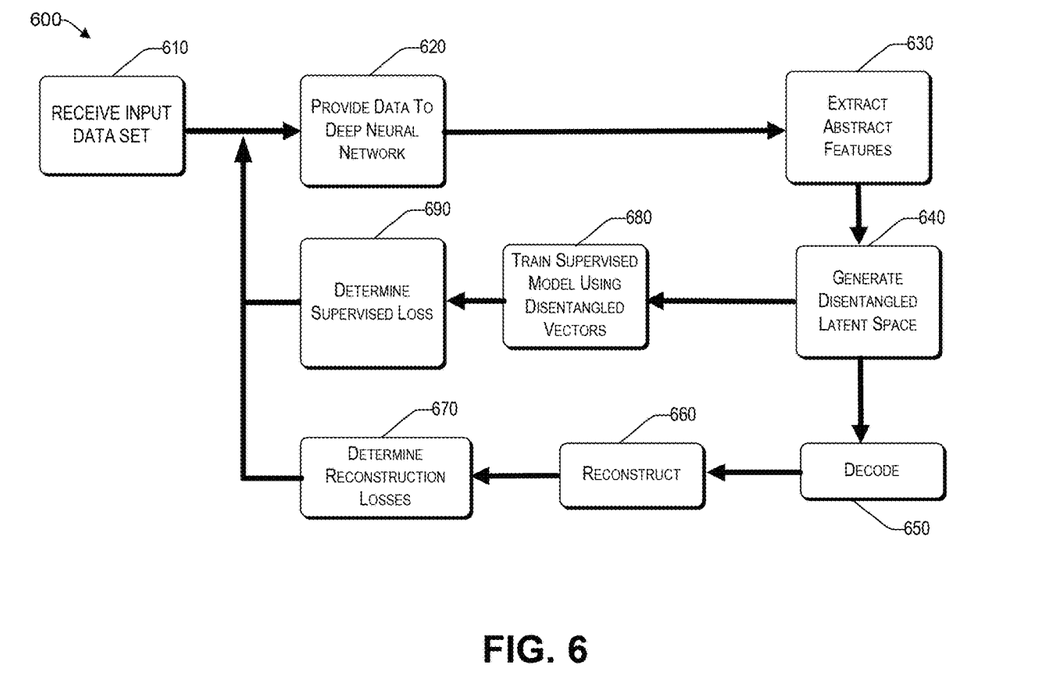
FIG. 6 is a flowchart for a method of training an interpretable deep learning model according to an embodiment.

Referring now to FIG. 6, a method 600 of training an interpretable deep learning model is shown according to an embodiment. The method 600 may include receiving 610 an input set of data. The data may comprise abstract data features. In an application, the method 600 may be used for example to perform a specific task of classifying features present in the input data. The input set of data may be provided 620 to a deep neural network. The deep neural network may comprise a β-VAE. Features may be extracted 630 from the deep neural network by the encoder. A latent space of vectors comprising extracted disentangled feature vectors learned from the input data may be generated 640 by the encoder. The latent space of vectors may be decoded 650 by a decoder. The decoded data from the latent space may be reconstructed 660. Reconstruction losses may be determined 670, which may be used to train the output generated in the latent space.

In addition, the disentangled vectors may be used to train 680 a supervised model for an upstream classification or regression task. For example, users may want to predict the label of the input image. Given an image, users may want the model to predict if it is a "Dog" or a "Cat". The error between the reconstructed input (the output from the decoder at block 650) and the original input data is the reconstruction error (this is unsupervised loss).

The output of the supervised model (for example, a classification or a prediction), may be compared with the label of the data to determine 690 the classification/regression loss. This is the supervised loss. For example, if the model predicts the image is a "Dog", but the ground truth label is a "Cat". The error may be used to compute the loss.

The combination of reconstruction loss and classification/regression loss may be used to train the models (for example, the encoder, the decoder, and the task model (classification/regression)).

Once there is a disentangled space generated (block 640), the process may associate dimensions of the disentangled vector with a semantically meaningful concept in the input. For example, for a human face as input, there may be a disentangled vector of perhaps five dimensions. In an exemplary association, dimension number one may represent the color of the hair, dimension number two, represents the skin tone, dimension number three, represents the orientation of the face and so on. To achieve semantically meaningful data, noise may be added to a selected dimension. In some embodiments each dimension of the disentangled vector may be assumed to be appropriately normalized. Each time noise is added, the decoder may be used to reconstruct the input using this noisy latent vector. The process may repeat for various values of noise in range [0, 1] and each time the input is reconstructed. Ideally, the set of reconstructed inputs should indicate what semantic concept is represented by the dimension.

The process may consider a second dimension and repeat the above steps to identify semantic concepts and so on for each dimension. In some embodiments, analysis of the set of reconstructed inputs for each dimension provides the ability to associate each dimension with a semantically meaningful concept.

Why does adding noise to one dimension change only a single concept in the image? This is because the dimensions are disentangled. So, the process may independently change the dimensions one after the other and analyze their effect on the input image. And the changes to one does not necessarily correlate with changes to the other.

Example Computer Platform

Figure 7:
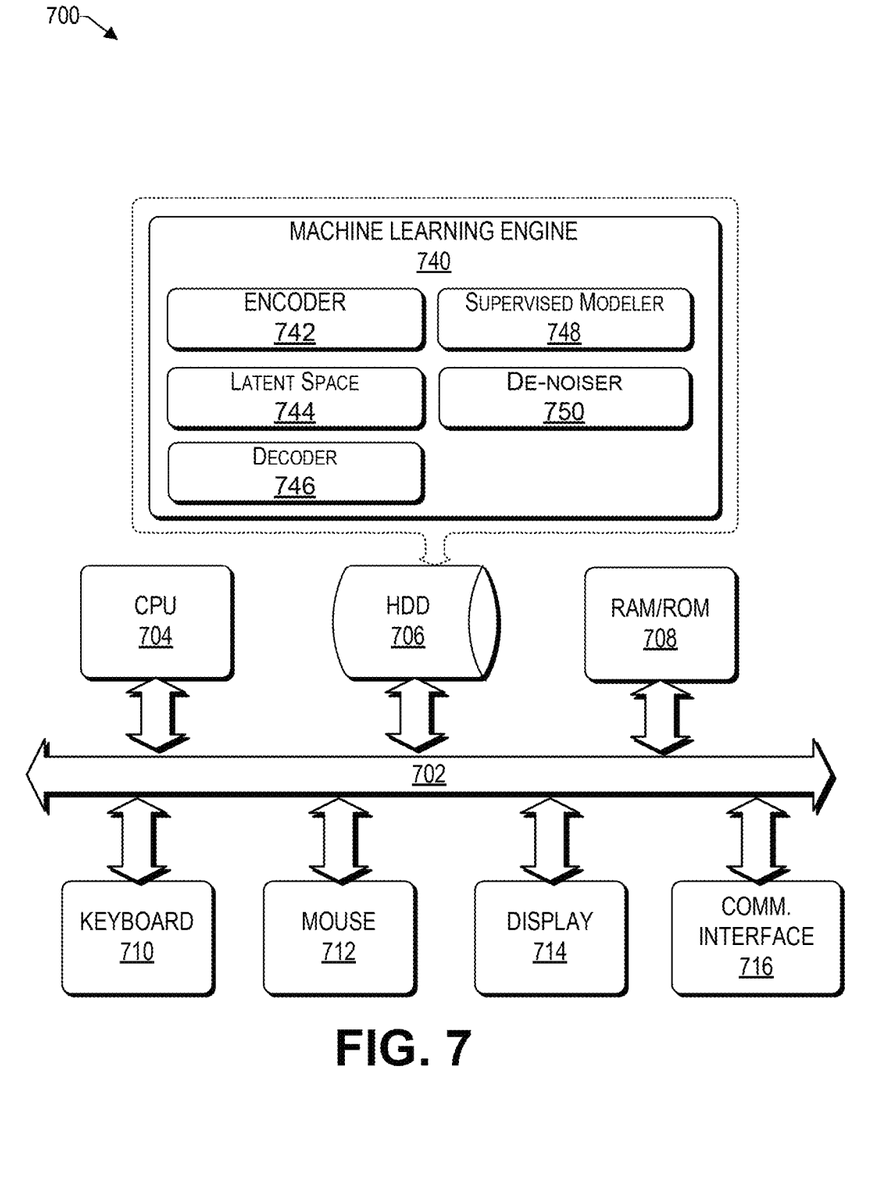
FIG. 7 is a functional block diagram illustration of a computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 7 is a functional block diagram illustration of a computer hardware platform that can communicate with various networked components, such as a training input data source, the cloud, etc. In particular, FIG. 7 illustrates a network or host computer platform 700, as may be used to implement a server, such as the machine learning server 116 of FIG. 1.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the machine learning engine 740, in a manner described herein. Generally, the machine learning engine 740 may be configured to operate a deep neural network under the embodiments described above. The machine learning engine 740 may have various modules configured to perform different functions. In some embodiments, the machine learning engine 740 may operate under the processes of an autoencoder. For example, there may be an encoder module 742 that is operative to interpret input data and provide feature extraction. The encoder module 742 may be configured to generate a latent space 744 of feature dimensions. A decoder module 746 may process the data in the latent space 744 and perform reconstruction of the input data to optimize the data used by the encoder module 742.

In some embodiments, the platform 700 may include a supervised modeler module 748. The supervised modeler module 748 is operative to perform one or more low-complexity modelling tasks. Examples of supervised learning processes may include classifiers, linear regression, logistic regression, a support vector machine (SVM), a K-nearest neighbor, decision trees, and a random forest.

In some embodiments, a de-noiser module 750 may be included which adds noise to the data to mask some features and make an underlying dimensional criterion more readily apparent. In some embodiments, losses from the decoder module 746 and/or the from supervised modeler module 748 may be used to generate the noise.

In one embodiment, the HDD 706 can store an executing application that includes one or more library software modules, such as those for the Java™ Runtime Environment program for realizing a JVM (Java™ virtual machine).

Example Cloud Platform

As discussed above, functions relating to data processing using a low-complexity model to explain the output from a deep learning model, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least fourdeployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
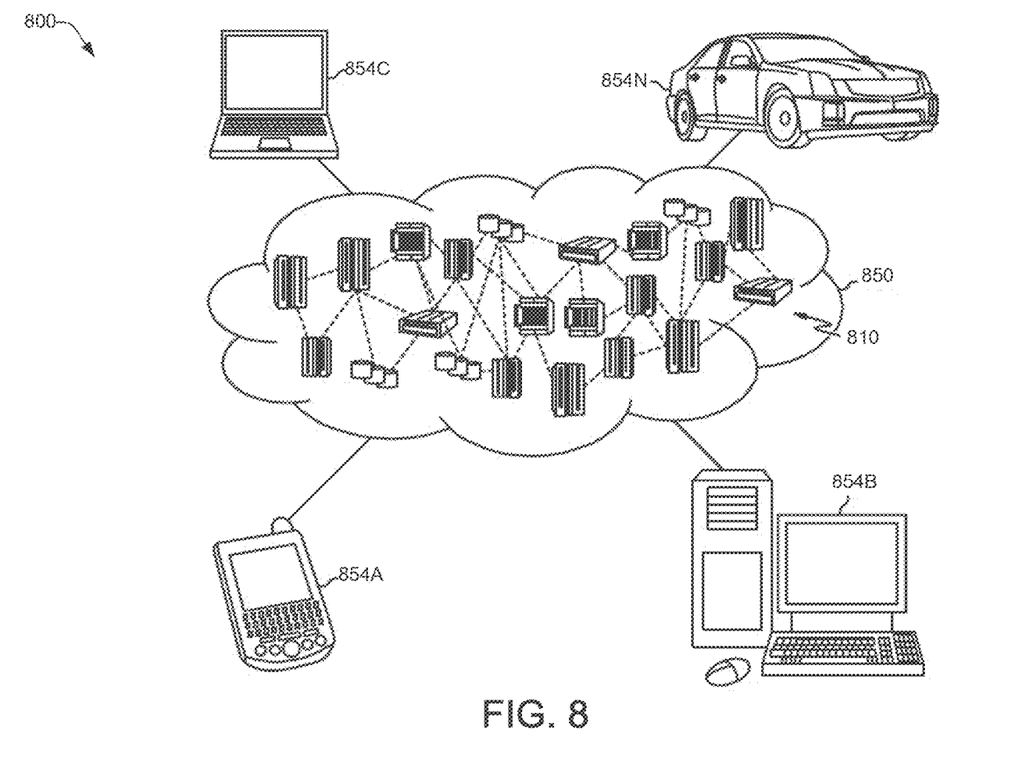
FIG. 8 depicts a cloud computing environment, consistent with an illustrative embodiment.

Referring now to FIG. 8, an illustrative cloud computing environment 800 is depicted. As shown, cloud computing environment 800 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
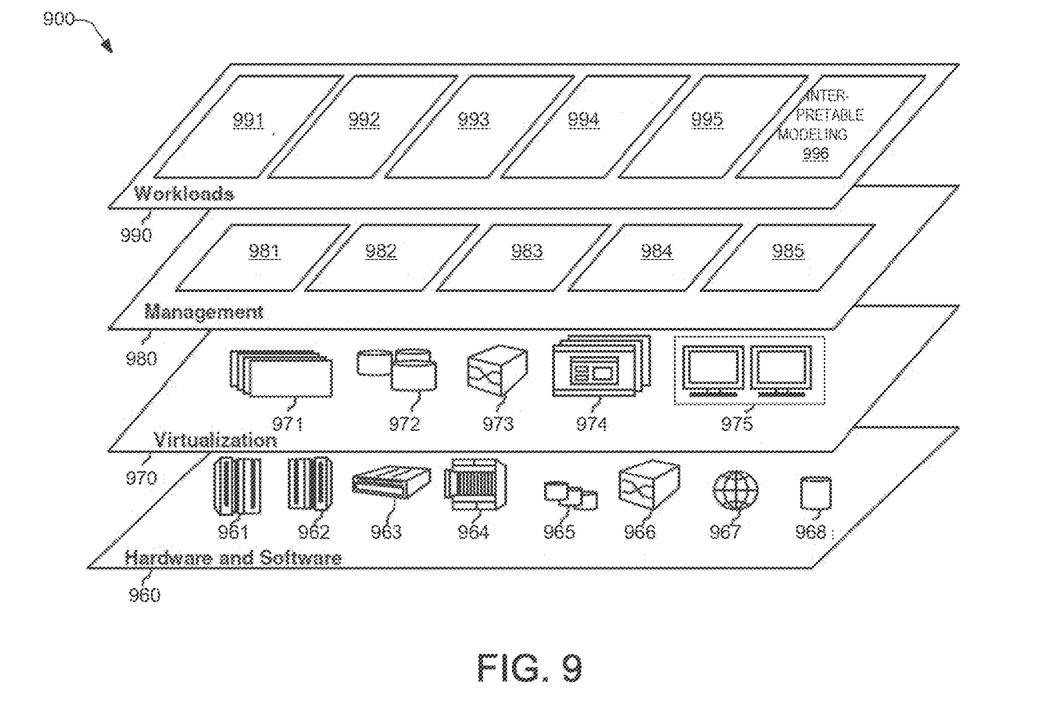
FIG. 9 depicts abstraction model layers, consistent with an illustrative embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and interpretable modeling 996, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of training an interpretable deep learning model for a machine learning system, comprising:
   receiving an input set of data;
   providing the input set of data to a deep neural network model;
   extracting features from the deep neural network model;
   generating a latent space of vectors comprising the extracted features;
   feeding the latent space of vectors generated from extracted features of the deep neural network model to a task-specific model, wherein the task-specific model is a low-complexity and linear learning model;
   generating interpretable predictions of feature dimensions from the task-specific model;
   reconstructing the input set of data using a decoder module;
   determining a reconstruction error loss from reconstructing the input set of data;
   determining a classification loss or a regression loss from a task specific output set of data; and
   training an autoencoder, the decoder module, and the low-complexity learning model, using a combination of (i) the reconstruction error loss and (ii) the classification loss or the regression loss.

2. The method of claim 1, wherein the features are extracted using an encoder module.

3. The method of claim 1, wherein the latent space of vectors are disentangled representations of the input set of data.

4. The method of claim 1, wherein the autoencoder is a Beta variational autoencoder, and the method further comprising using the Beta variational autoencoder to extract the features from the deep neural network.

5. The method of claim 1, further comprising:
   associating a feature dimension for each vector in the latent space with a semantically meaningful characteristic; and
   generating the interpretable predictions of feature dimensions based on the semantically meaningful characteristic of each vector.

6. A computer program product for training an interpretable deep learning model for a machine learning system, the computer program product comprising:
   one or more non-transitory computer readable storage media, and program instructions collectively stored on the one or more computer readable storage media, the program instructions comprising:
   receiving an input set of data;
   providing the input set of data to a deep neural network model;
   extracting features from the deep neural network model;
   generating a latent space of vectors comprising the extracted features;
   feeding the latent space of vectors generated from extracted features of the deep neural network model to a task-specific model, wherein the task-specific model is a low-complexity and linear learning model;
   generating interpretable predictions of feature dimensions from the task-specific model;
   reconstructing the input set of data using a decoder module;
   determining a reconstruction error loss from reconstructing the input set of data;
   determining a classification loss or a regression loss from a task specific output set of data; and
   training an autoencoder, the decoder module, and the low-complexity learning model, using a combination of (i) the reconstruction error loss and (ii) the classification loss or the regression loss.

7. The computer program product of claim 6, wherein the features are extracted using an encoder module.

8. The computer program product of claim 6, wherein the latent space of vectors are disentangled representations of the input set of data.

9. The computer program product of claim 6, wherein:
   the autoencoder is a Beta variational autoencoder; and
   the program instructions further comprise using the Beta variational autoencoder to extract the features from the deep neural network.

10. The computer program product of claim 6, wherein the program instructions further comprise:

associating a feature dimension for each vector in the latent space with a semantically meaningful characteristic; and generating the interpretable predictions of feature dimensions based on the semantically meaningful characteristic of each vector.

11. A computer server, comprising:
a network connection;
one or more computer readable storage media;
  a processor coupled to the network connection and coupled to the one or more computer readable storage media; and
  a computer program product comprising program instructions collectively stored on the one or more computer readable storage media, the program instructions comprising:
receiving an input set of data;
providing the input set of data to a deep neural network model;
extracting features from the deep neural network model;
generating a latent space of vectors comprising the extracted features;
feeding the latent space of vectors generated from extracted features of the deep neural network model to a task-specific model to a task-specific model, wherein the task-specific model is a low-complexity and linear learning model;
generating interpretable predictions of feature dimensions from the task-specific model;
reconstructing the input set of data using a decoder module;
determining a reconstruction error loss from reconstructing the input set of data;
determining a classification loss or a regression loss from a task specific output set of data; and
training an autoencoder, the decoder module, and the low-complexity learning model, using a combination of (i) the reconstruction error loss and (ii) the classification loss or the regression loss.

12. The computer server of claim 11, wherein the features are extracted using an encoder module.

13. The computer server of claim 11, wherein the latent space of vectors are disentangled representations of the input set of data.

14. The computer server of claim 13, wherein:
the autoencoder is a Beta variational autoencoder; and
the program instructions further comprise using the Beta variational autoencoder to extract the features from the deep neural network.

15. The computer server of claim 11, wherein the program instructions further comprise:
associating a feature dimension for each vector in the latent space with a semantically meaningful characteristic; and
generating the interpretable predictions of feature dimensions based on the semantically meaningful characteristic of each vector.

16. A method of training an interpretable deep learning model for a machine learning system, comprising:
receiving an input set of data;
providing the input set of data to a Beta variational autoencoder;
generating by the Beta variational autoencoder, an output representation of the input set of data;
processing the output representation generated by the Beta variational autoencoder, using a low-complexity linear learning model;
determining by the low-complexity learning model a task specific output set of data;
providing an interpretation of the input set of data based on the task specific output set of data;
reconstructing the input set of data using a decoder module;
determining a reconstruction error loss from reconstructing the input set of data;
determining a classification loss or a regression loss from the task specific output set of data; and
training an autoencoder, the decoder module, and the low-complexity learning model, using a combination of (i) the reconstruction error loss and (ii) the classification loss or the regression loss.

17. The method of claim 16, wherein the output representation of the input set of data generated by the Beta variational autoencoder, is a latent space of dimensional vectors, organized by features with a semantic relationship.

18. The method of claim 16, wherein the low-complexity learning model is one of: a parametric model, a non-parametric model, a decision tree, a regression tree, or an ensemble model.

19. A computer program product for training an interpretable deep learning model for an artificial intelligence computing system, the computer program product comprising:
one or more non-transitory computer readable storage media, and program instructions collectively stored on the one or more computer readable storage media, the program instructions comprising:
receiving an input set of data;
providing the input set of data to a Beta variational autoencoder;
generating by the Beta variational autoencoder, an output representation of the input set of data;
processing the output representation generated by the Beta variational autoencoder using a low-complexity learning model that is linear;
determining by the low-complexity learning model a task specific output set of data;
providing an interpretation of the input set of data based on the task specific output set of data;
reconstructing the input set of data using a decoder module;
determining a reconstruction error loss from reconstructing the input set of data;
determining a classification loss or a regression loss from the task specific output set of data; and
training the Beta variational autoencoder, the decoder module, and the low-complexity learning model using a combination of (i) the reconstruction error loss and (ii) the classification loss or the regression loss.

20. The computer program product of claim 19, wherein the low-complexity learning model is one of: a parametric model, a non-parametric model, a decision tree, a regression tree, or an ensemble model.

* * * * *